Figure 1:
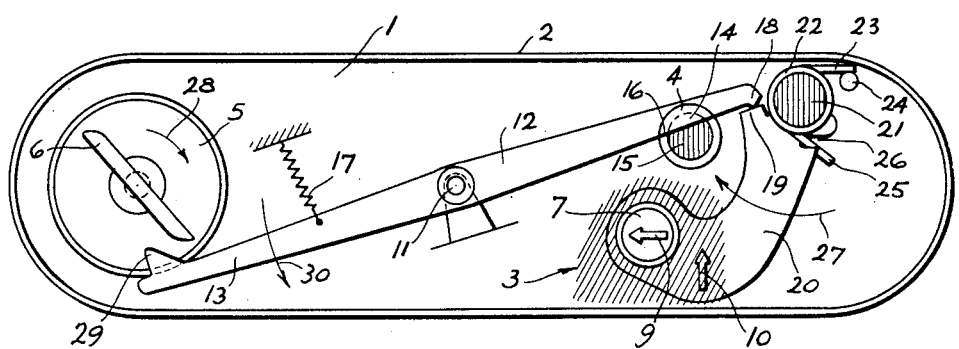

May 5, 1953   W. NOACK ET AL   2,637,253
INDICATING DEVICE FOR PHOTOGRAPHIC CAMERAS
Filed Dec. 4, 1950

INVENTORS
WALTER NOACK
HELMUT NAUMANN
BY Mock + Blum
ATTORNEYS

Patented May 5, 1953

2,637,253

UNITED STATES PATENT OFFICE 2,637,253

INDICATING DEVICE FOR PHOTOGRAPHIC CAMERAS

Walter Noack and Helmut Naumann, Braunschweig, Germany, assignors to Voigtlander & Sohn Aktiengesellschaft, Braunschweig, Germany, a corporation of Germany Application December 4, 1950, Serial No. 198,924
In Switzerland December 22, 1949

2 Claims. (Cl. 95—31)

This invention relates to an indicating device for photographic cameras and has particular relation to an indicating device by which the next step to be taken in actuating a camera is indicated by a mark appearing in a window or the like of the camera body.

The main object of our present invention is to provide in photographic cameras an indicating device, in which the next step to be taken in actuating the camera is indicated by a visible mark to operators of the camera.

Another object of our invention is to provide an indicating device of the beforementioned type which is of simple construction, safe in operation, visible to the operator in picture-taking position of the camera, and the readings of which consist of direct indications and, therefore, not liable to erroneous interpretation.

Further objects and the advantages of the invention will be apparent from the following specification and claims and the appended drawings.

In the cameras now in use, it cannot be recognized whether a fresh area of film has been wound in place and whether the camera is ready for taking a picture. If, for example, after taking a picture the film has not been wound, double exposure is prevented by automatic locking of the release, in modern cameras. But there will be a delay in taking a picture, because a fresh area of film has to be wound in place first, and important pictures are often missed owning to such delay.

In cameras provided with certain other locking devices, an unexposed area of film cannot be wound to the take-up spool. In such cases too, it is often rather important to see at once, whether the film has been wound, so that no delay in taking a picture is caused.

In the use of cameras which are not provided with means for preventing errors in winding the film, it is particularly useful to have an indication of the next step required in actuating the camera.

The cameras now in use are usually not provided with indicators. The previously suggested indicators for photographic cameras were not satisfactory. Most of them were complicated, expensive and liable to trouble in operation. For example, the use of pneumatic means was suggested in one case. According to another suggestion, a slide provided with a mark was carried by the film to an indicating position in order to show that the film has been wound. In other devices, motion of a spool used in winding the film was utilized for controlling the indicating device, and the spool and said device were connected by an intermediate gear. It was also suggested to provide the film proper with a mark which was a cut-out produced by a knife arranged in the camera. Said mark was supposed to limit the feed motion and act on the indicating device, and this required the insertion of an elastic stop designed as a lever of contact. It was also contemplated to use an arrangement, in which, after winding a fresh area of film into place, a pin was pressed into the film by means of a spring lever to which the pin was connected, in order to arrest the film.

In many of these previously suggested devices, the indicating device was not in the field of vision of the operator in picture taking position, so that the camera had to be turned around in order to read the indicator.

According to our present invention, the indicator comprises a movable member, the displacements of which are brought about, on the one hand, by means involved in the transport of the film within the camera and, on the other hand, by the action of elements connected with the release. In each of its end positions, said member causes the appearance in a window or the like, of a mark which points to the camera element to be actuated next.

We prefer to use a member which can be turned, shifted, or the like and to arrange the marks on said member proper. An element of the locking mechanism of the release may be used as the carrier of the marks or a separate member may be associated with said mechanism in such manner that said member is moved when the mechanism locks or frees the release. According to a preferred embodiment of our invention, this separate member, which preferably consists of a lever, is elastically pressed against the element of the release locking mechanism, which is moved when the release is locked or unlocked, so that said member moves simultaneously with said element.

For example, the unlocking means of the release may be actuated by turning the winding key of the take-up spool and the use of a further transmission member, in addition to the locking lever proper, may be unnecessary in this case. The construction of the arrangement according to the present invention is very simple and it is not necessary to provide for costly tolerances, as far as the indicator is concerned.

The marks of the indicator may consist of signs or symbols of different colors. In order to eliminate the necessity of an interpretation of the marks, the respective camera parts to be actuated may be preferably provided with a mark of identical color. For example, in the picture-taking position of the camera, the lever will cause the appearance of a red mark on the camera window. This is an indication that the operator has to actuate the release button which has likewise a red mark. After taking a picture, owing to the change in the position of the indicator lever, which takes place when the release is actuated, a mark of another color, for example black, will be visible in the window. This other color indicates that the handle of the take-up spool, which is likewise black or is marked black in this case, has to be actuated next.

Instead of using colors as indicating symbols, an arrow may be caused to appear in the camera window, the head of which points to the camera part to be actuated.

The appended drawings illustrate by way of example and without limitation, an embodiment of our invention.

Figure 2:
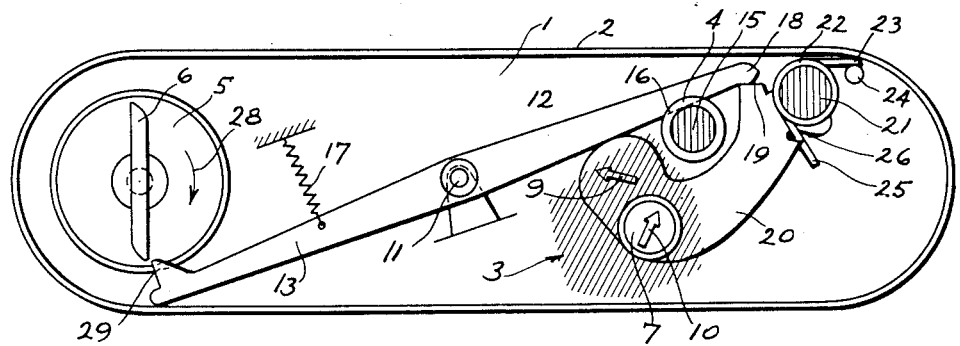

Figure 1 shows this embodiment in top view in the locked position of the release, and Figure 2 is a similar view of the device in the releasing position of the mechanism.

The gear for locking and freeing the release is diagrammatically shown in connection with the indicator device in both figures. The entire device is mounted on the narrow surface 1 of the camera 2. For the sake of clearness, the conventional top plate of the camera has been omitted in the drawings, but it is indicated by hatching near window 7 and denoted by reference numeral 3. Release button 4, and winding key 5 project through the top plate which is provided with a window 7, for viewing the individual indicating marks.

Figure 1 shows the device in its locking position, in which an arrow 9 pointing to the winding key 5 to be actuated in this position, appears in the window.

Figure 2 illustrates the locking gear in the position for taking pictures. In this position, another arrow 10 appears in window 7 and points to release button 4 to be actuated next.

In the drawings, reference numeral 11 denotes a bolt or the like, which is fastened to the camera body and on which locking lever 12, 13 pivots. The end of lever arm 12 engages a groove 14 of release bolt 15. Owing to its own elasticity, the end of lever 12 is forced upward at the moment of unlocking the release, i. e. at the moment when the end of lever 12 is removed from groove 14 of release bolt 15. Upon being forced upward, lever 12 comes to rest with its edge 16 on the ungrooved surface of bolt 15, until, upon depressing button 4, the end of lever 12 is again caused to enter slot 14 of bolt 15 under the action of spring 17 and against the effect of its own elasticity. This specific embodiment of the locking device, which is shown here by way of example, does not form part of our invention, which can be used also in combination with locking arrangements of other design and construction.

Lever arm 12 is provided at its end with a head 18, against which head 19 of a swinging lever 20 is pressed. Arrows 9 and 10 are engraved in this lever 20, which pivots on bolt 21 rigidly fastened to the camera body. Spring 22 is applied to said bolt 21. One end 23 of this spring is fastened between stop pin 24 and the edge of camera casing 2 or to a stop pin not shown in the drawings. The other end 25 of spring 22 engages a slot 26 of lever 20, and thus permanently presses lever 20 in the direction of arrow 27 against head 18 of lever 12. Thus, if lever 12 is caused to move in the manner explained above from the locking position shown in Figure 1 to the releasing position shown in Figure 2, lever 20 will simultaneously follow, its head 19 engaging head 18 of lever 12, and thus arrow 10 will be caused to appear in window 7 of top plate 3, as shown in Figure 2.

Lever 20 may have a shape or design different from that shown in the drawings. However, it is essential that this lever 20 be positively forced to shift marks 9 and 10 to the reading position in accordance with the actuation of the camera and that said lever be forced to move simultaneously with the locking and unlocking movements of the locking mechanism.

It is also essential that said movements of part 20 take place simultaneously with the switching on and off of the release lock. We have found it preferable to have part 19 of indicator 20 pressed elastically against the locking member of the release locking means, as shown in the above example and drawings, but other constructions may also be used in carrying out our invention.

The manner in which the end of lever arm 12 is removed from slot 14 of release bolt 15 is not essential. It does not form part of our invention and the above example serves merely to explain the operation of the complete arrangement according to the invention.

The take-up spool for the roll film is provided with a conventional head part designed as a so-called winding key 5. The latter has a handle 6, by means of which the key may be turned in the direction of arrow 28 in order to wind a fresh area of film, equal to the area exposed for each picture, into place. Upon turning handle 6, the latter engages projection 29 of lever arm 13, which is held in the position shown in Figure 1 by the action of spring 17. This is the position shown in Figure 1, in which the release is locked. Upon turning handle 6, this handle causes displacement of projection 29 and turning of lever 13, against the action of spring 17, in the direction of arrow 30, while lever arm 12 is simultaneously lifted from groove 14 in the manner described above. This latter position is illustrated in Figure 2.

As already mentioned above, this position is preserved by the upward movement of lever 12 and engagement of the unslotted surface of bolt 15 by said lever. In this position, projection 29 does not interfere any more with rotation of winding key 5 and its handle 6. Before actuation of the release, projection 29 will not return to the range within which handle 6 is moved.

It will be understood that our invention is not limited to the specific elements, steps and other details described above and illustrated in the drawings and may be carried out with various modifications without departing from the scope of the invention, as defined in the appended claims.

What we claim is:

1. In a photographic camera comprising a shutter and first means for releasing the shutter; second means for locking and freeing said means for releasing the shutter, said second means including a two-armed lever pivotally connected in its central portion to the camera body; an indicating device comprising a one-armed lever pivotally connected to the camera body, provided with a first and second mark, and adapted to be pivotally moved to a first and second end position and exhibit in a window of the camera body said first and second mark directly indicating a camera element to be actuated next, in said first and second position, respectively; said one-armed lever being elastically pressed against an end of said two-armed lever and its movements being controlled by said end of the two-armed lever.

2. In a photographic camera comprising a shutter and first means for releasing the shutter; second means for locking and freeing said means for releasing the shutter, said second means including a two-armed lever pivotally connected at its central portion to the camera body; third means for transporting film within the camera, said third means including a take-up spool; an indicating device comprising a one-armed lever pivotally connected to the camera body, provided with a first and second mark and adapted to be pivotally moved, to a first and second end position and exhibit in a window of the camera body said first and second mark directly indicating a camera element to be actuated next in said first and second position, respectively; one arm of said two-armed lever being urged by spring means toward the axis of said film spool, while the other arm of the two-armed lever is urged toward the means for releasing the shutter; said one armed lever being elastically pressed against the end of said other arm and its movements being controlled by said end of said other arm.

WALTER NOACK.
HELMUT NAUMANN.

References Cited in the file of this patent

UNITED STATES PATENTS

| Number | Name | Date |
|---|---|---|
| 1,224,300 | Hoyt | May 1, 1917 |
| 1,281,998 | Parish | Oct. 15, 1918 |
| 2,289,800 | Nagel | July 14, 1942 |

FOREIGN PATENTS

| Number | Country | Date |
|---|---|---|
| 489,646 | Great Britain | Aug. 2, 1938 |
| 213,437 | Switzerland | May 1, 1941 |
| 917,605 | France | Sept. 16, 1946 |